United States Patent
Yamashita et al.

(10) Patent No.: US 9,860,469 B2
(45) Date of Patent: Jan. 2, 2018

(54) PIXEL UNIT CELL HAVING CONVERSION CIRCUIT

(71) Applicant: Taiwan Semiconductor Manufacturing Company, Ltd., Hsin-Chu (TW)

(72) Inventors: Yuichiro Yamashita, Hsinchu (TW); Jhy-Jyi Sze, Hsinchu (TW)

(73) Assignee: TAIWAN SEMICONDUCTOR MANUFACTURING CO., LTD., Hsin-Chu (TW)

( * ) Notice: Subject to any disclaimer, the term of this patent is extended or adjusted under 35 U.S.C. 154(b) by 0 days.

(21) Appl. No.: 15/417,410

(22) Filed: Jan. 27, 2017

(65) Prior Publication Data

US 2017/0142364 A1 May 18, 2017

Related U.S. Application Data

(63) Continuation of application No. 14/280,333, filed on May 16, 2014, now Pat. No. 9,560,301.

(51) Int. Cl.
*H04N 5/374* (2011.01)
*H04N 5/378* (2011.01)
*H04N 5/3745* (2011.01)

(52) U.S. Cl.
CPC ......... *H04N 5/37457* (2013.01); *H04N 5/378* (2013.01); *H04N 5/37455* (2013.01)

(58) Field of Classification Search
CPC ........... H04N 5/37457; H04N 5/37455; H04N 5/378; H01L 27/14609
USPC .................................................. 348/300, 308
See application file for complete search history.

(56) References Cited

U.S. PATENT DOCUMENTS

| | | | |
|---|---|---|---|
| 6,252,462 B1* | 6/2001 | Hoffman | H04N 5/3745 250/214 A |
| 6,992,341 B2 | 1/2006 | Watanabe | |
| 7,446,807 B2* | 11/2008 | Hong | H01L 27/14609 257/E27.132 |
| 9,560,301 B2* | 1/2017 | Yamashita | H04N 5/37457 |
| 2005/0161712 A1* | 7/2005 | Koyama | H04N 5/3559 257/292 |
| 2006/0023097 A1* | 2/2006 | Watanabe | H04N 5/361 348/308 |
| 2006/0044438 A1* | 3/2006 | Mauritzson | H04N 3/155 348/308 |
| 2006/0077271 A1* | 4/2006 | Watanabe | H04N 5/363 348/300 |
| 2007/0007438 A1* | 1/2007 | Liu | H04N 5/378 250/214 A |
| 2010/0051786 A1* | 3/2010 | Lotto | H04N 5/357 250/214 A |
| 2015/0201141 A1* | 7/2015 | Petilli | H04N 5/3696 348/301 |

* cited by examiner

*Primary Examiner* — Nhan T Tran
(74) *Attorney, Agent, or Firm* — Haynes and Boone, LLP

(57) ABSTRACT

A circuit includes a signal line and a pixel unit cell. The pixel unit cell includes one or more light sensing elements, a conversion circuit, and a selection switch between the conversion circuit and the signal line. In the pixel unit cell, the conversion circuit is configured to convert charge carriers from the one or more light sensing elements to a voltage signal at an output node of the conversion circuit.

20 Claims, 11 Drawing Sheets

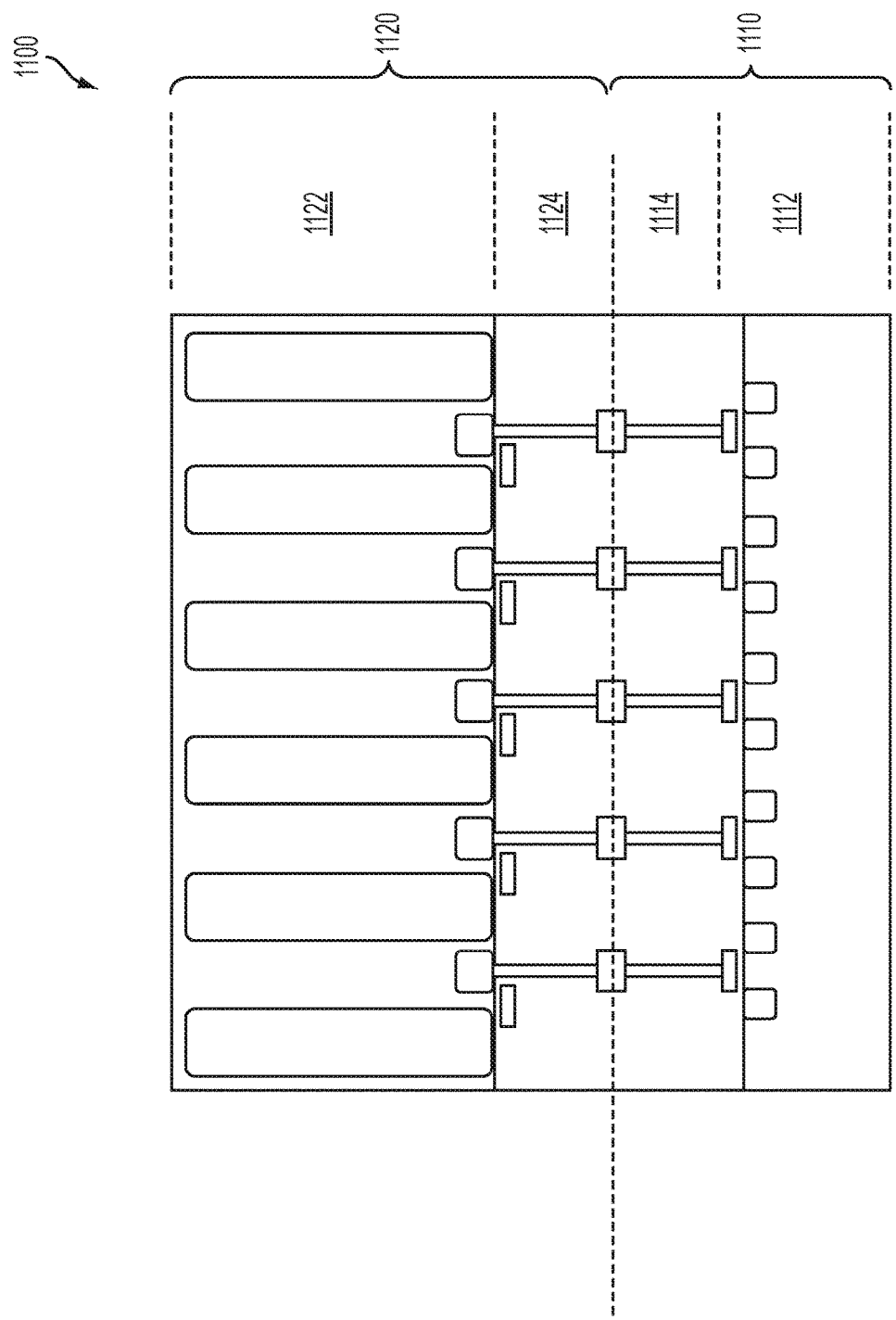

PIXEL UNIT CELL HAVING CONVERSION CIRCUIT

PRIORITY DATA

The present application is a continuation application of U.S. patent application Ser. No. 14/280,333, filed May 16, 2014, entitled "PIXEL UNIT CELL HAVING CONVERSION CIRCUIT", now U.S. Pat. No. 9,560,301, the entire disclosure of which is incorporated herein by reference.

BACKGROUND

Image sensors provide a grid of pixel unit cells for recording an intensity or brightness of incident light. In some applications, each pixel unit cell responds to the incident light by accumulating charge carriers (such as electrons and/or holes) generated when the incident light passes into/through a silicon layer. The greater intensity or brightness of the incident light, the more charge carriers are generated. The charge carriers are picked-up by a pick-up circuit and converted into an electrical signal which is subsequently usable by another circuit to provide color and/or brightness information for suitable applications, such as digital cameras. According to various types of light sensing elements and pick-up circuits, some image sensors are recognizable as a charge-coupled device (CCD), a complementary metal oxide semiconductor (CMOS) image sensor (CIS), an active-pixel sensor (APS), or a passive-pixel sensor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 11 is a cross-sectional view of a portion of another image sensor in accordance with some embodiments.

DETAILED DESCRIPTION

Figure 1:
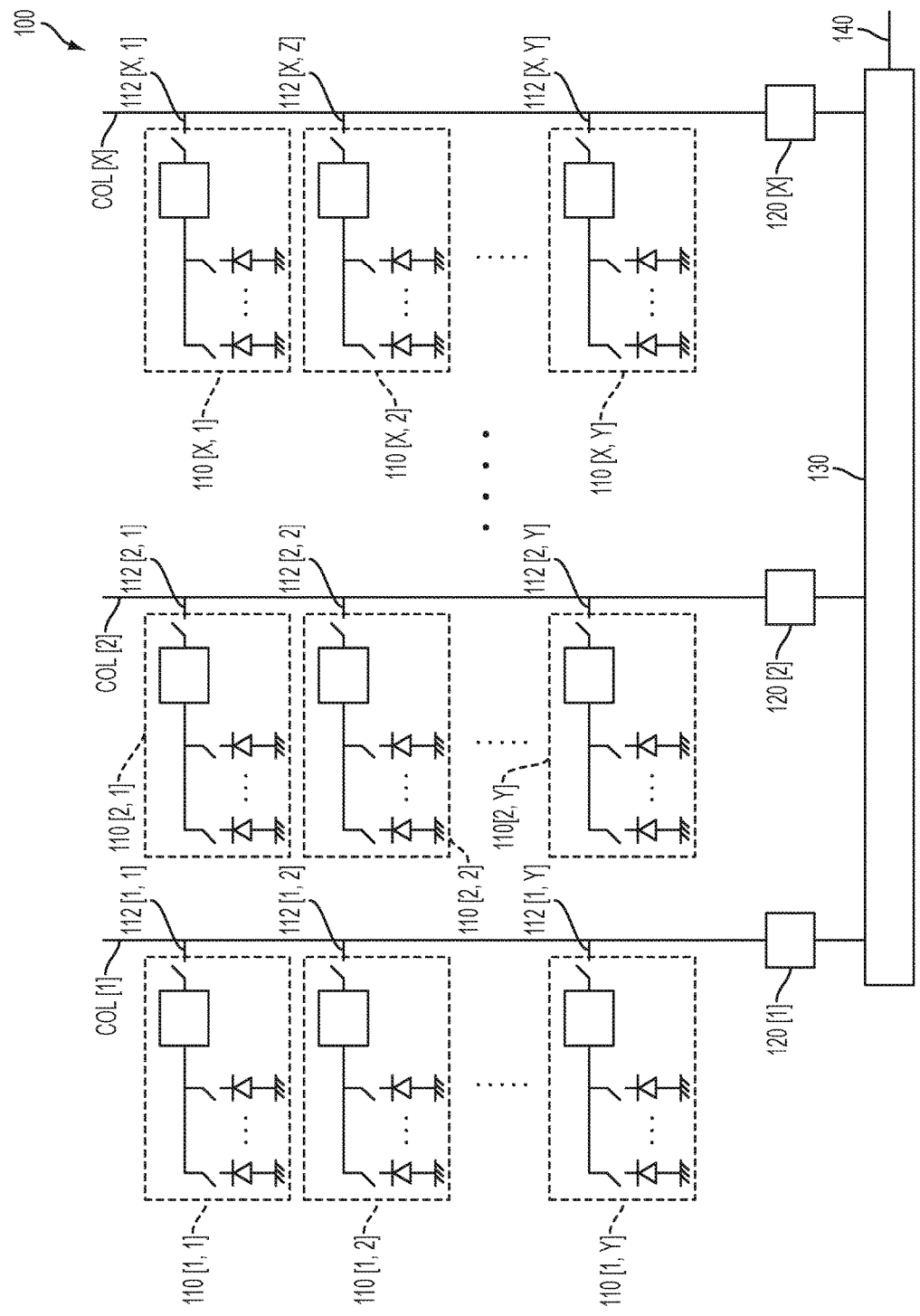
FIG. 1 is a block diagram of an image sensor in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, each pixel unit cell of an image sensor includes a charge integration circuit. In some embodiments, each charge integration circuit is equipped with a switch capable of causing a voltage difference between an input node and an output node of the charge integration circuit to be substantially zero. As a result, parasitic capacitance observable at the input node of the charge integration circuit is significantly reduced or eliminated.

FIG. 1 is a block diagram of an image sensor 100 in accordance with an embodiment. Image sensor 100 includes a plurality of pixel unit cells 110[1,1], 110[1,2], 110[1,Y], 110[2,1], 110[2,2], 110[2,Y], 110[X,1], 110[X,2], and 110[X,Y] arranged as rows of pixel unit cells and columns of pixel unit cells. X and Y are positive integers. In some embodiments, X and Y each range from 10 to 10000. In some embodiments, X and Y are not limited to the range described above. Image sensor 100 includes a plurality of signal lines COL[1], COL[2], and COL[X], a plurality of sampling circuits 120[1], 120[2], and 120[X], a read-out circuit 130, and a read-out terminal 140.

Each pixel unit cell of the plurality of pixel unit cells 110[1,1], 110[1,2], 110[1,Y], 110[2,1], 110[2,2], 110[2,Y], 110[X,1], 110[X,2], and 110[X,Y] includes a corresponding output node 112[1,1], 112[1,2], 112[1,Y], 112[2,1], 112[2,2], 112[2,Y], 112[X,1], 112[X,2], and 112[X,Y]. Each signal line of the plurality of signal lines COL[I], COL[2], and COL[X] is electrically coupled to the output nodes of the pixel unit cells in a corresponding column of the columns of pixel unit cells. For example, for the column including pixel unit cells 110[1,1], 110[1,2], and 110[1,Y], signal line COL[I] is coupled to output nodes 112[1,1], 112[1,2], and 112[1,Y]; for the column including pixel unit cells 110[2,1], 110[2,2], and 110[2,Y], signal line COL[2] is coupled to output nodes 112[2,1], 112[2,2], and 112[2,Y]; and for the column including pixel unit cells 110[X,1], 110[X,2], and 110[X,3], signal line COL[X] is coupled to output nodes 112[X,1], 112[X,2], and 112[X,Y].

Details of the pixel unit cells 110[1,1], 110[1,2], 110[1,Y], 110[2,1], 110[2,2], 110[2,Y], 110[X,1], 110[X,2], and 110[X,Y] are further illustrated in conjunction with FIGS. 2, 3, 4, 6, and 7.

Each sampling circuit of the sampling circuits 120[1], 120[2], and 120[X] is coupled to a corresponding one of the plurality of signal lines COL[I], COL[2], and COL[X]. For example, sampling circuit 120[1] is coupled to signal line COL[I]; sampling circuit 120[2] is coupled to signal line COL[2]; and sampling circuit 120[X] is coupled to signal line COL[X]. In some embodiments, each sampling circuit of the sampling circuits 120[1], 120[2], and 120[X] includes a sample-and-hold circuit configured to generate an analog signal representing an accumulated charge of a selected pixel unit cell in the column associated with the sampling circuit. In some embodiments, each sampling circuit of the sampling circuits 120[1], 120[2], and 120[X] further includes an analog-to-digital converter configured to convert the analog signal from the corresponding sample-and-hold circuit to a digital code. In some embodiments, each sampling circuit of the sampling circuits 120[1], 120[2], and 120[X] comprises a Delta-Sigma analog-to-digital converter.

Read-out circuit 130 is coupled to sampling circuits 120[1], 120[2], and 120[X] and is configured to generate an output signal at read-out terminal 140. In some embodiments, the output signal at read-out terminal 140 is an analog signal or a digital code. In some embodiments, read-out circuit 130 also controls the operations of the sampling circuits 120[1], 120[2], and 120[X]. If the sampling circuits 120[1], 120[2], and 120[X] outputs analog signals to the read-out circuit 130, read-out circuit 130 includes one or more analog-to-digital converters configured to convert the analog signals to one or more digital codes in some embodiments.

Figure 2:
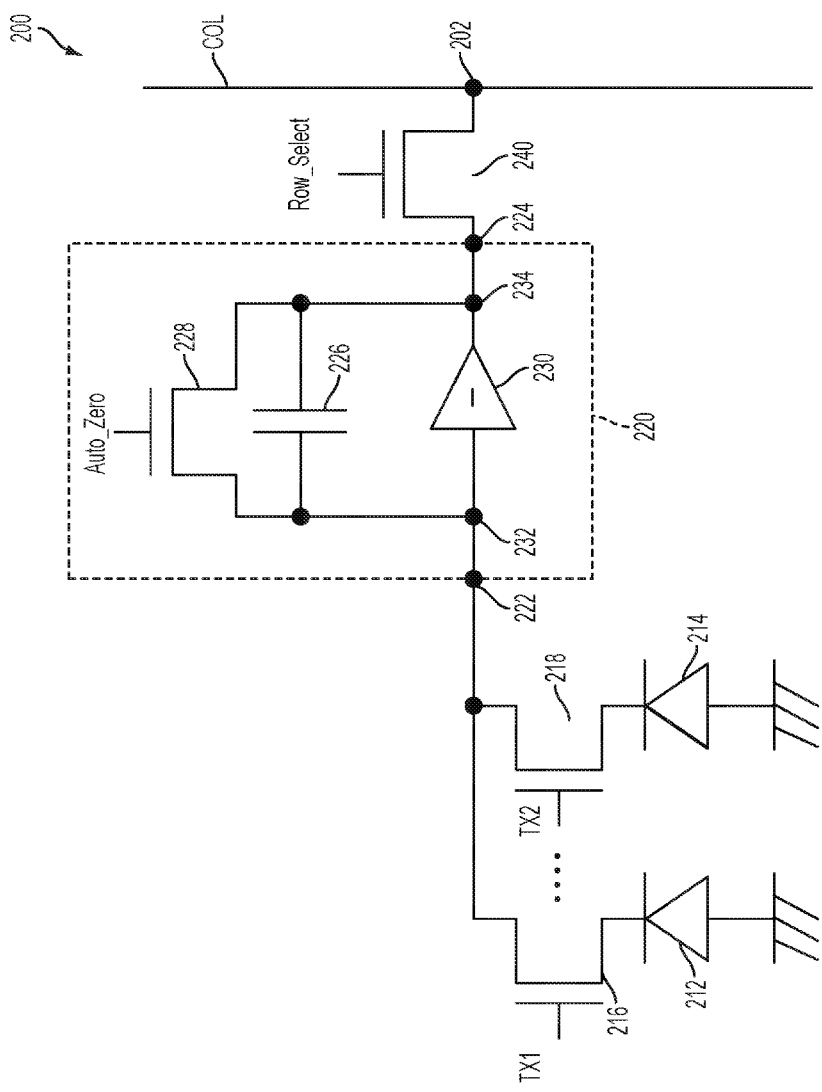
FIG. 2 is a circuit diagram of a pixel unit cell in accordance with some embodiments.

FIG. 2 is a circuit diagram of a pixel unit cell 200 in accordance with some embodiments. Pixel unit cell 200 is usable as an example pixel unit cell of an image sensor, such as image sensor 100 in FIG. 1. In some embodiments, pixel unit cell 200 is usable as one of pixel unit cells 110[1,1], 110[1,2], 110[1,Y], 110[2,1], 110[2,2], 110[2,Y], 110[X,1], 110[X,2], and 110[X,Y]. Pixel unit cell 200 includes a node 202 electrically coupled to a signal line COL. In some embodiments, signal line COL is usable as the corresponding one of signal lines COL[1], COL[2], and COL[X], and node 202 is usable as the corresponding one of output node 112[1,1], 112[1,2], 112[1,Y], 112[2,1], 112[2,2], 112[2,Y], 112[X,1], 112[X,2], and 112[X,Y].

Pixel unit cell 200 includes one or more light sensing elements 212 and 214, a set of switching devices 216 and 218, a conversion circuit 220, and a selection switch 240. Switching device 216 is between light sensing element 212 and conversion circuit 220, and switch 218 is between light sensing element 214 and conversion circuit 220. Selection switch 240 is between conversion circuit 220 and signal line COL.

The one or more light sensing elements 212 and 214 are configured to convert intensity or brightness of an incident light into charge carriers. Each switching device of the set of switching devices 216 and 218 is configured to electrically couple or decouple a corresponding one of the one or more light sensing elements 212 and 214 to or from the conversion circuit 220 responsive to a corresponding control signal TX1 and TX2. Switching devices 216 and 218 are N-type transistors. In some embodiments, switching devices 216 and 218 are P-type transistors, transmission gates, or other types of switching devices.

In some embodiments, the one or more light sensing elements 212 and 214 are photodiodes. In some embodiments, the one or more light sensing elements 212 are manufactured using a CMOS process. Only two sensing elements 212, 214 are depicted in FIG. 1 as an example. In some embodiments, there is only one light sensing element in pixel unit cell 200. In some embodiments, there are more than two light sensing elements in pixel unit cell 200. In some embodiments, if there is only one light sensing element in pixel unit cell 200, the set of switching devices is omitted.

Conversion circuit 220 has an input node 222, an output node 224, a capacitive device 226, a switch 228, and an amplifier 230. The input node 222 is coupled to the switching devices 216 and 218, and the output node is coupled to selection switch 240.

In some embodiments, the light sensing element 212 or 214 and its corresponding switching device are configured to have a "complete charge transfer structure." In some embodiments, when the switching device is turned on, all of the charges, either electrons or holes, are completely drained to the input node 222.

Amplifier 230 includes an input node 232 and an output node 234. Input node 232 functions as the input node 222 of conversion circuit 220, and output node 234 functions as the output node 224 of conversion circuit 220. In some embodiments, amplifier 230 functions as an inverting amplifier between the input node 232 and the output node 234. In some embodiments, amplifier 230 is a singled-ended inverting amplifier. In some embodiments, amplifier 230 is a differential amplifier, where input node 232 corresponds to an inverting input of the differential amplifier, and the output node 234 corresponds to a non-inverting output of the differential amplifier.

Capacitive device 226 is coupled between input node 232 of amplifier 230 and output node 234 of amplifier 230. In some embodiments, amplifier 230 and capacitive device 226 are configured as a charge integration circuit capable of converting charge carriers from the light sensing element 212 or light sensing element 214 to a voltage signal at output node 224 of conversion circuit 200. Switch 228 is between input node 232 and output node 234 of amplifier 230 and is configured to electrically couple or decouple input node 232 to or from output node 234 responsive to a control signal Auto_Zero. If switch 228 is turned on, capacitive device 226 is discharged and a voltage difference between node 232 and node 234 is substantially zero. Therefore, switch 228 is also referred to as an auto-zero switch. Switch 228 is an N-type transistor. In some embodiments, switch 228 is a P-type transistor, a transmission gate, or other types of switching devices.

In some embodiments, a parasitic capacitor attributable by various interconnection structures and electrical components such as switching devices 216 and 218 is observable at node 222. In some applications, node 222 is also referred to as a floating diffusion node, and the capacitance of the parasitic capacitor observable at node 222 is also referred to as floating diffusion capacitance. Assuming the floating diffusion capacitance has a value of $C_{FD}$, and the capacitance of capacitive device 228 is $C_{FB}$, without the auto-zero switch 228a, the conversion gain of conversion circuit 220 would be proportional to $1/(C_{FB}+C_{FD})$. With the auto-zero switch 228, the effect of parasitic capacitance $C_{FD}$ is significantly reduced or eliminated.

By operating switch 228 and capacitive device 226 as described above, a direct current (DC) voltage component at node 232 is maintained at substantially the same voltage level throughout the entire operation of conversion circuit 220. Thus, node 232 is also known as being configured as a virtual ground node.

In some embodiments, the capacitance value of the capacitive device 226 ($C_{FB}$) is electrically configurable, which renders the conversion gain to be programmable.

Moreover, selection switch 240 is between node 202 and node 224. Selection switch 240 is configured to electrically couple or decouple node 224 to or from node 202 responsive to a row-selection signal Row_Select.

Figure 3:
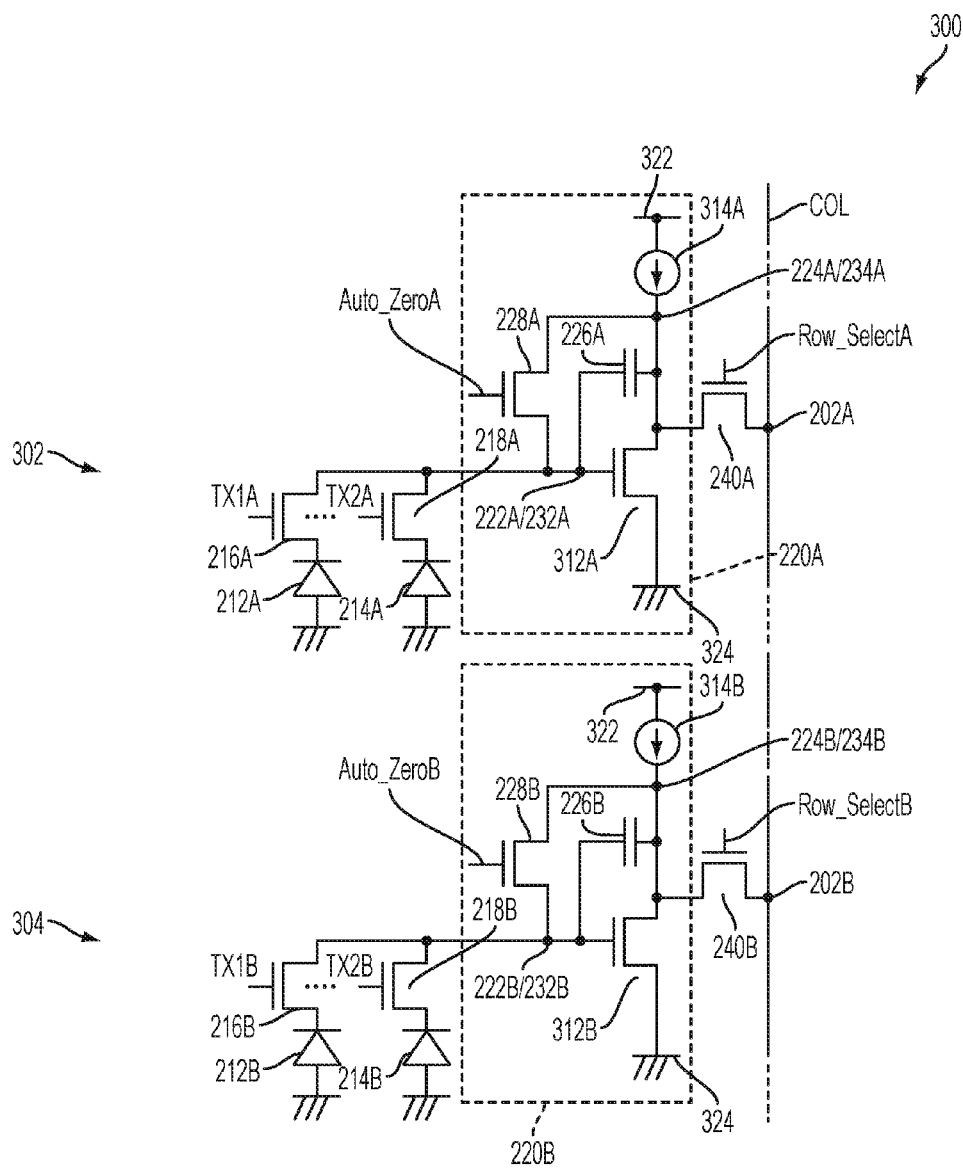
FIG. 3 is a circuit diagram of a portion of an image sensor in accordance with some embodiments.

FIG. 3 is a circuit diagram of a portion of an image sensor 300 in accordance with some embodiments. Image sensor 300 includes at least two pixel unit cells 302 and 304 coupled to signal line COL. Pixel unit cells 302 and 304 each have a configuration similar to pixel unit cell 200 in FIG. 2. The components in pixel unit cell 302 that are the same or similar to those in pixel unit cell 200 are given the same reference number plus a notation "A." The components in pixel unit cell 304 that are the same or similar to those in pixel unit cell 200 are given the same reference number plus a notation "B." Detailed description of pixel unit cells 302 and 304 is thus omitted.

In some embodiments, image sensor 300 has a configuration similar to that of image sensor 100 in FIG. 1, and two pixel unit cells 302 and 304 and one signal line COL depicted in FIG. 3 are used as an example implementation of image sensor 100.

Pixel unit cell 302 includes an N-type transistor 312A and a current source 314A. Transistor 312A and current source 314A together form an amplifier corresponds to amplifier 230. Current source 314A is coupled between a first power supply node 322 and output node 234A. A source of transistor 312A is coupled to a second power supply node 324, a drain of transistor 312A is coupled to output node 234A, and a gate of transistor 312A is coupled to input node 232A. Transistor 312A is configured to have a common-source configuration, and current source 314A is usable to power transistor 312A and to act as an active load of the resulting amplifier.

Pixel unit cell 304 includes an N-type transistor 312B and a current source 314B variously correspond to transistor 312A and current source 314A of pixel unit cell 302. Detailed description of transistor 312B and current source 314B is thus omitted.

Figure 4:
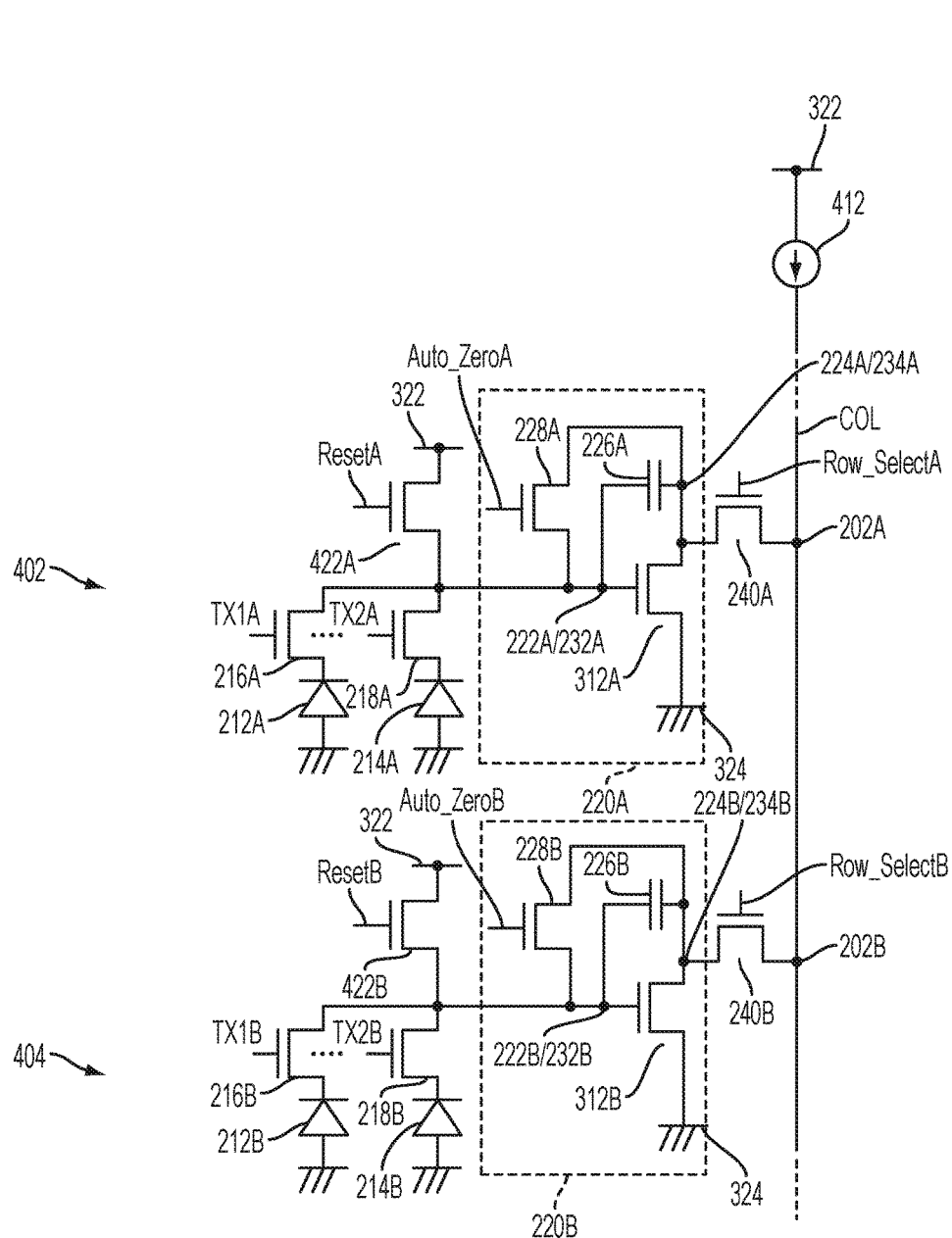
FIG. 4 is a circuit diagram of a portion of another image sensor in accordance with some embodiments.

FIG. 4 is a circuit diagram of a portion of another image sensor 400 in accordance with some embodiments. Image sensor 400 includes at least two pixel unit cells 402 and 404 coupled to signal line COL. Pixel unit cells 402 and 404 each have a configuration similar to pixel unit cells 302 and 304 in FIG. 3. The components in pixel unit cell 402 that are the same or similar to those in FIG. 3 are given the same reference number. Detailed description regarding operations and configurations of pixel unit cells 402 and 404 that are the same or similar to those of pixel unit cell 200 is omitted.

Compared with image sensor 300, image sensor 400 has a current source 412 coupled to signal line COL in place of current sources 314A and 314B. Current source 412 is shared by all pixel unit cells in the same column associated with signal line COL. Therefore, if a selection switch 240A or 240B is turned on responsive to a corresponding row-selection signal Row_SelectA or Row_SelectB, current source 412 is coupled to the corresponding transistor 312A or 312B to function as an amplifier corresponding to amplifier 230 in FIG. 2.

Pixel unit cell 402 further includes a switch 422A configured to electrically couple or decouple input node 222A of conversion circuit 220A to or from first power supply node 322 in responsive to a reset signal ResetA. Pixel unit cell 404 also includes a switch 422B configured to electrically couple or decouple input node 222B of conversion circuit 220B to or from first power supply node 322 in responsive to a reset signal ResetB. Switches 422A and 422B sets nodes 222A and 223A at a predetermined voltage level if the corresponding pixel unit cells are not selected to sense the incident light. Switches 422A and 422B are N-type transistors. In some embodiments, switches 422A and 422B are P-type transistors, transmission gates, or other types of switching devices.

Figure 5:
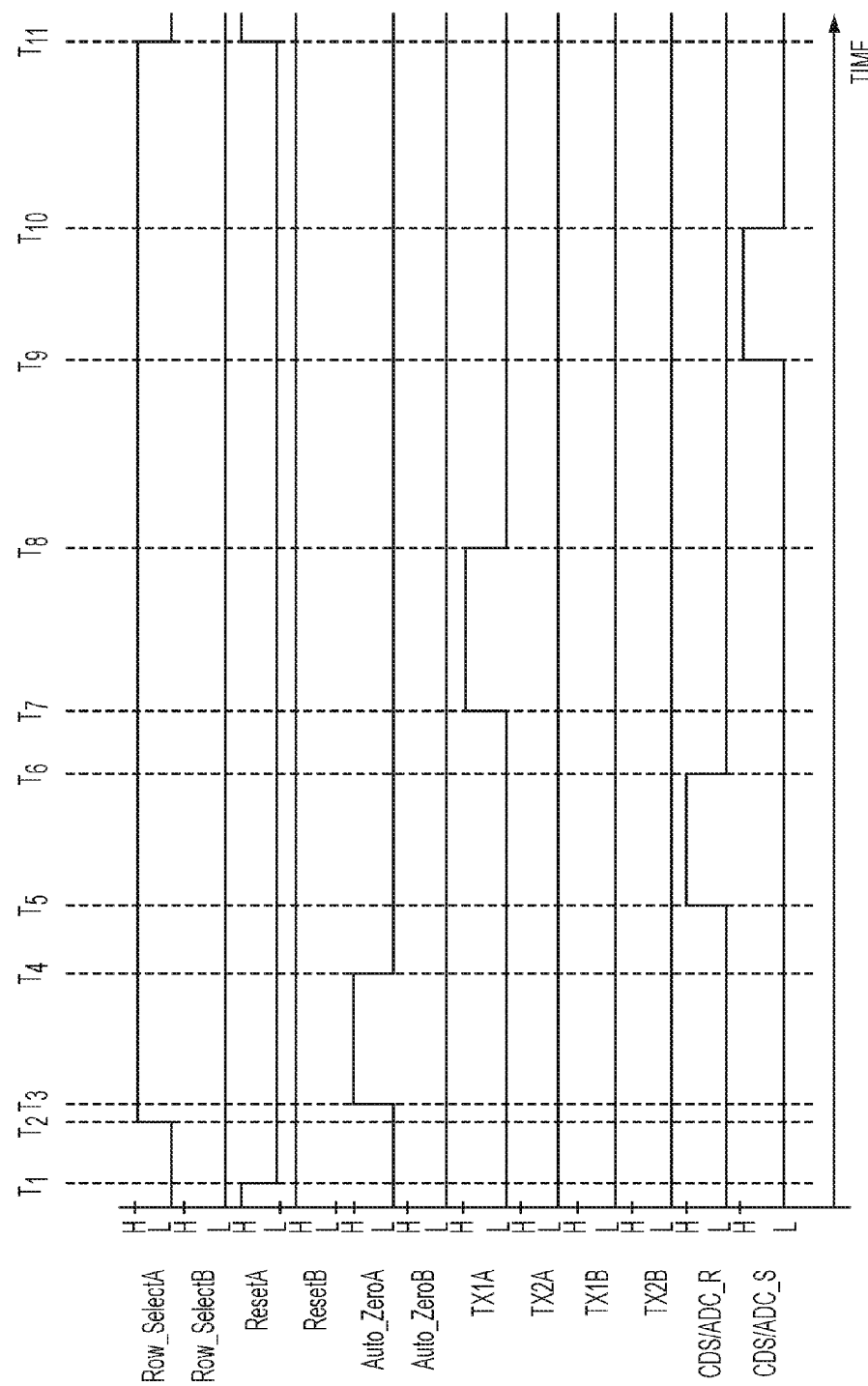
FIG. 5 is a graph of waveforms of various signals of the image sensor in FIG. 4 in accordance with some embodiments.

FIG. 5 is a graph of waveforms of various signals of the image sensor 400 in FIG. 4 in accordance with some embodiments.

At time $T_1$, signal ResetA transitions from a logical high level to a logical low level to turn off switch 422A. Thus, node 222A is decoupled from power supply node 322. Meanwhile, signal ResetB remains at the logical high level to turn on switch 422B. Thus, node 222B is coupled to power supply node 322 and is set at the logical high level.

At time $T_2$, signal Row_SelectA transitions from the logical low level to the logical high level indicating that pixel unit cell 402 is selected to be coupled to signal ling COL. As a result, switch 240A is turned on. In some embodiments, only one pixel unit cell in the column of pixel unit cells associated with signal line COL is electrically coupled to signal line COL. For example, only signal Row_SelectA is set to the logical high level, and signal Row_SelectB remains at the logical low level to turn off switch 240B. After switch 240A is turned on, current source 412 is electrically coupled with transistor 312A. Current source 412 and transistor 312A together function as an inverting amplifier having a common-source configuration.

At time $T_3$, signal Auto_ZeroA transitions from the logical low level to the logical high level to turn on switch 228A. Thus, node 232A and node 234A are coupled together, and a voltage difference between node 232A and node 234A is substantially zero. As a result, the capacitive device 226A is discharged, and a direct-current (DC) operation condition (e.g., DC biasing points) for transistor 312A is established. Meanwhile, signal Auto_ZeroB remains at the logical low level to turn off switch 228B.

At time $T_4$, signal Auto_ZeroA transitions from the logical high level to the logical low level to turn off switch 228A. Without the conductive path through transistor 228A, capacitive device 226A functions as a feedback capacitor between output node 234A and input node 232A of the amplifier formed by current source 412 and transistor 312A. Current source 412, transistor 312A, and capacitive device 226A together function as a charge integration circuit capable of converting charge carriers received by node 232A to a voltage signal at node 234A.

At time $T_5$, a signal CDS/ADC_R provided to read-our circuit 130 or a corresponding sampling circuit 120[1], 120[2], or 120[X] (FIG. 1) coupled to signal line COL transitions from the logical low level to the logical high level. At time $T_6$, signal CDS/ADC_R transitions from the logical high level to the logical low level. During the period signal CDS/ADC_R is at the logical high level, the corresponding sampling circuit 120[1], 120[2], or 120[X] is controlled to sense a first voltage level at signal line COL. The first voltage level represents a reference voltage level before a light sensing element is coupled to the input node 232A.

At time $T_7$, signal TX1A transitions from the logical low level to the logical high level to turn on switch 216A. Thus, light sensing element 212A is coupled to node 232A. Charge carriers generated by light sensing element 212A are transferred to node 232A. At time $T_8$, signal TX1A transitions from the logical high level to the logical low level to decouple light sensing element 212A from node 232A. During a predetermined period defined by time $T_7$ and time $T_8$, the charge integration circuit including current source 412, transistor 312A, and capacitive device 226A converts the charge carriers from light sensing element 212A to a voltage signal at node 234A, which is in turn transferred to signal line COL through switch 240A. Meanwhile, signals TX2A, TX1B, and TX2B remain at the logical low level to decouple light sensing element 214A from node 232A and to decouple light sensing elements 212B and 214B from node 232B.

At time $T_9$, a signal CDS/ADC_S provided to read-our circuit 130 or the corresponding sampling circuit 120[1], 120[2], or 120[X] transitions from the logical low level to the logical high level. At time $T_{10}$, signal CDS/ADC_S transitions from the logical high level to the logical low level. During the period signal CDS/ADC_S is at the logical high level, the corresponding sampling circuit 120[1], 120[2], or 120[X] is controlled to sense a second voltage level of signal line COL. The second voltage level represents a voltage level corresponding to the total charge carriers transferred from light sensing element 212A to capacitive device 226A.

At time $T_{11}$, signal Row_SelectA transitions from the logical high level to the logical low level indicating that pixel unit cell 402 is no longer selected to be coupled to signal ling COL. Also, signal ResetA transitions from the logical low level to the logical high level to turn on switch 422B. Thus, node 222A is coupled to power supply node 322 and is set at the logical high level.

Figure 6:
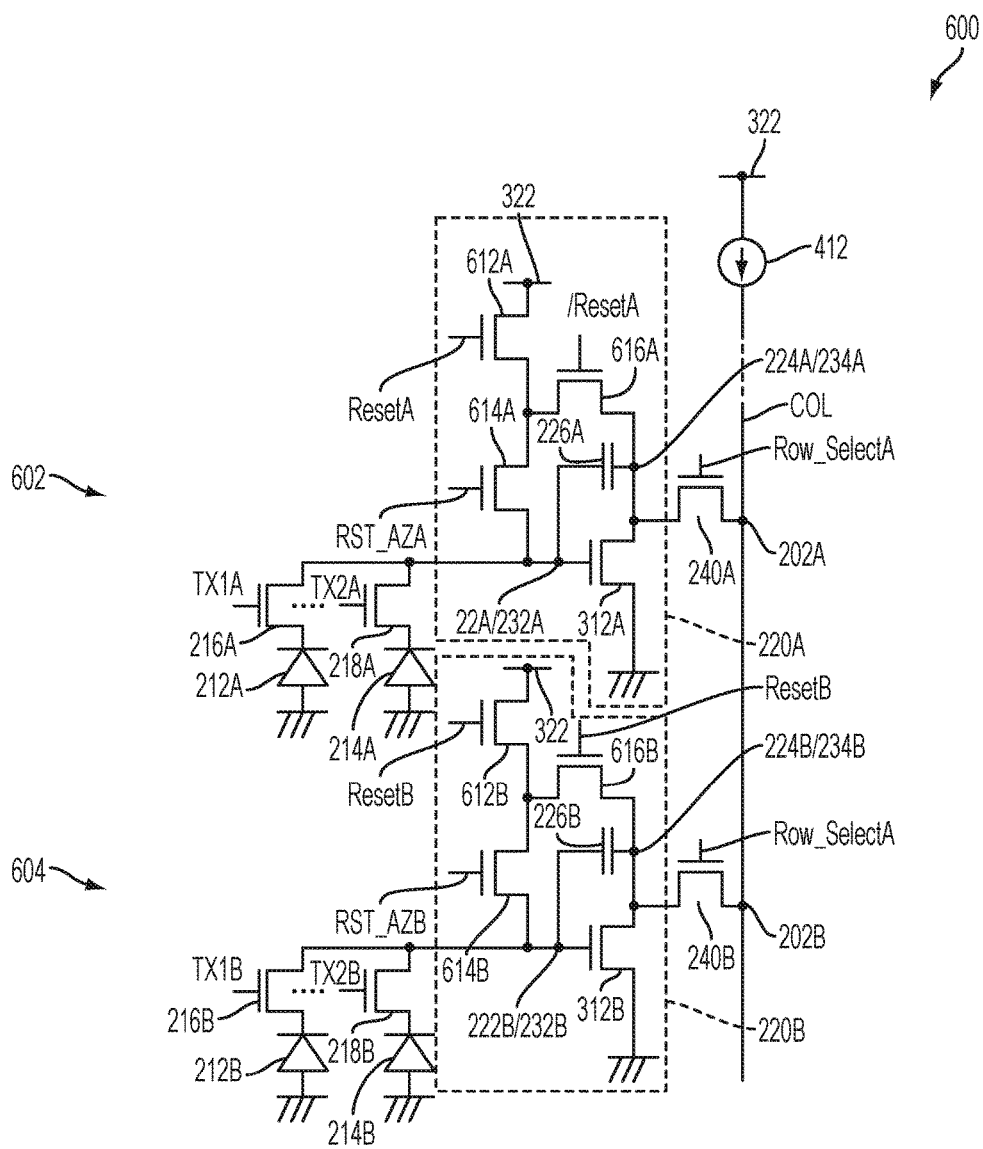
FIG. 6 is a circuit diagram of a portion of another image sensor in accordance with some embodiments.

FIG. 6 is a circuit diagram of a portion of another image sensor 600 in accordance with some embodiments. Image sensor 600 includes at least two pixel unit cells 602 and 604 coupled to signal line COL. Pixel unit cells 602 and 604 each have a configuration similar to pixel unit cells 402 and 404 in FIG. 4. The components in pixel unit cell 602 and pixel unit cell 604 that are the same or similar to those in FIG. 4 are given the same reference number. Detailed description regarding operations and configurations of pixel unit cells 602 and 604 that are the same or similar to those of pixel unit cells 402 and 404 is omitted.

Compared with image sensor 400, switch 422A and switch 228A are replaced with a set of switching devices including switches 612A, 614A, and 616A. Switch 612A and switch 614A are connected in series between power supply node 322 and input node 232A. Switch 616A has one end coupled to output node 234A and another end coupled to a node between switches 612A and 614A. Switch 612A is configured to be turned on when signal ResetA is at the high logical level. Switch 616A is configured to be turned on when signal ResetA is at the low logical level or a signal/ ResetA is at the high logical level. Signal/ResetA is logical complementary to signal ResetA. Switch 614A is configured to be turned on when a signal RST_AZA is at the high logical level. Signal RST_AZA indicates a resulting logical value by performing an OR operation on signal ResetA and Auti_ZeroA.

The operation of pixel unit cell 602 is similar to that of the pixel unit cell 402 or 404. For example, if signal ResetA is at the logically high level, switches 612A and 614A are turned on to set node 232A at the logically high level. When signal ResetA is at the logically low level and signal Auto_ZeroA is at the logically high level, switches 614A and 616A are turned on to cause a voltage difference between node 232A and node 234A to be substantially zero.

Pixel unit cell 604 includes a set of switching devices including switches 612B, 614B, and 616B variously controlled by signals ResetB, /ResetB, and RST_AZB. Signal/ ResetB is logical complementary to signal ResetB. Signal RST_AZB indicates a resulting logical value by performing an OR operation on signal ResetB and Auto_ZeroB. Elements 612B, 614B, 616B, /ResetB, and RST_AZB correspond to 612A, 614A, 616A, /ResetA, and RST_AZA. The operation of pixel unit cell 604 is similar to that of the pixel unit cell 602, and description thereof is omitted.

Figure 7:
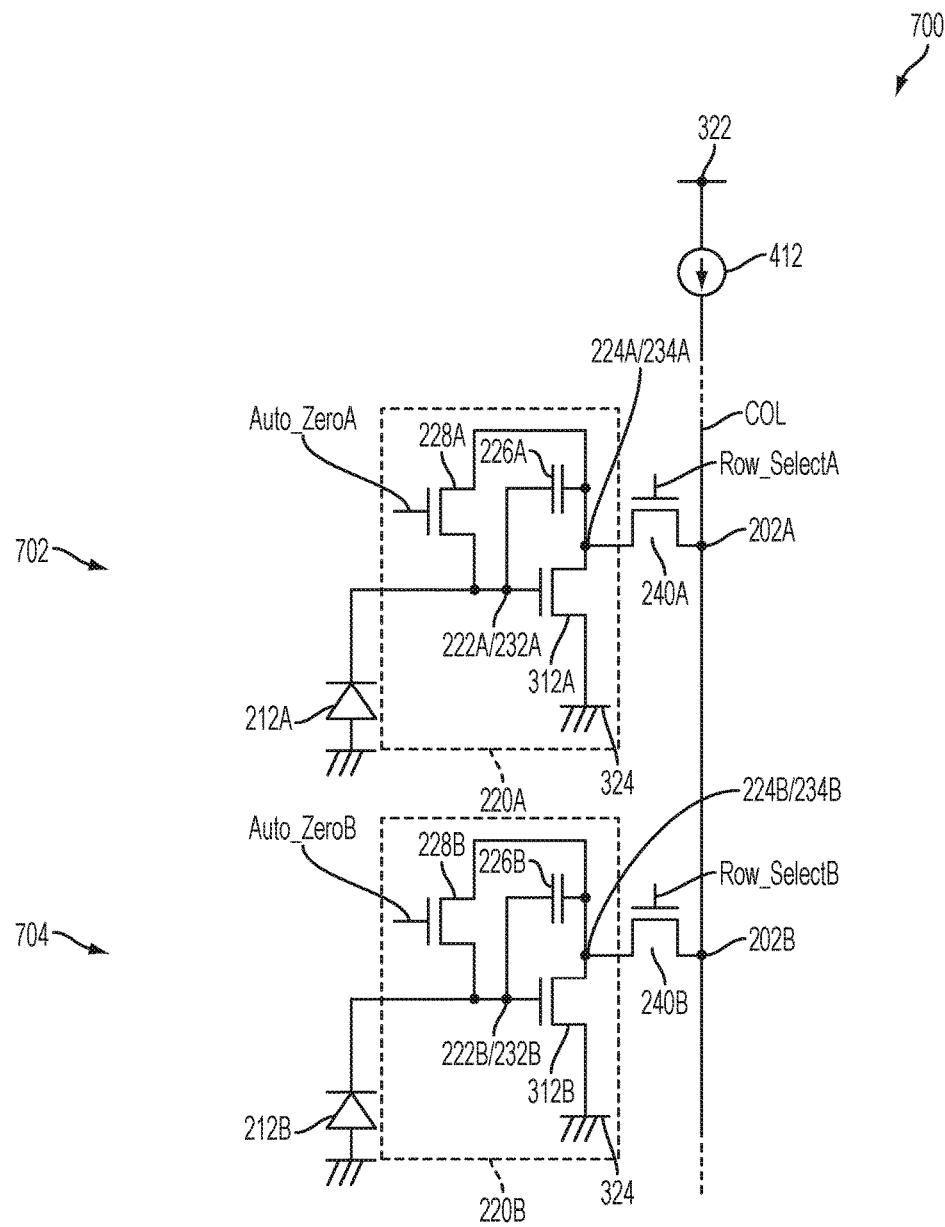
FIG. 7 is a circuit diagram of a portion of another image sensor in accordance with some embodiments.

FIG. 7 is a circuit diagram of a portion of another image sensor 700 in accordance with some embodiments. Image sensor 700 includes at least two pixel unit cells 702 and 704 coupled to signal line COL. Pixel unit cells 702 and 704 each have a configuration similar to pixel unit cells 402 and 404 in FIG. 4. The components in pixel unit cell 702 and pixel unit cell 704 that are the same or similar to those in FIG. 4 are given the same reference number. Detailed description regarding operations and configurations of pixel unit cells 702 and 704 that are the same or similar to those of pixel unit cells 402 and 404 is omitted.

Compared with image sensor 400, pixel unit cell 702 has only one light sensing element 212A, and pixel unit cell 704 has only one light sensing element 212B. Switches 216A and 216B and corresponding control signals TX1A. TX2A, TX1B, and TX2B are omitted. Operation of image sensor 700 is further illustrated in conjunction with FIG. 8.

Figure 8:
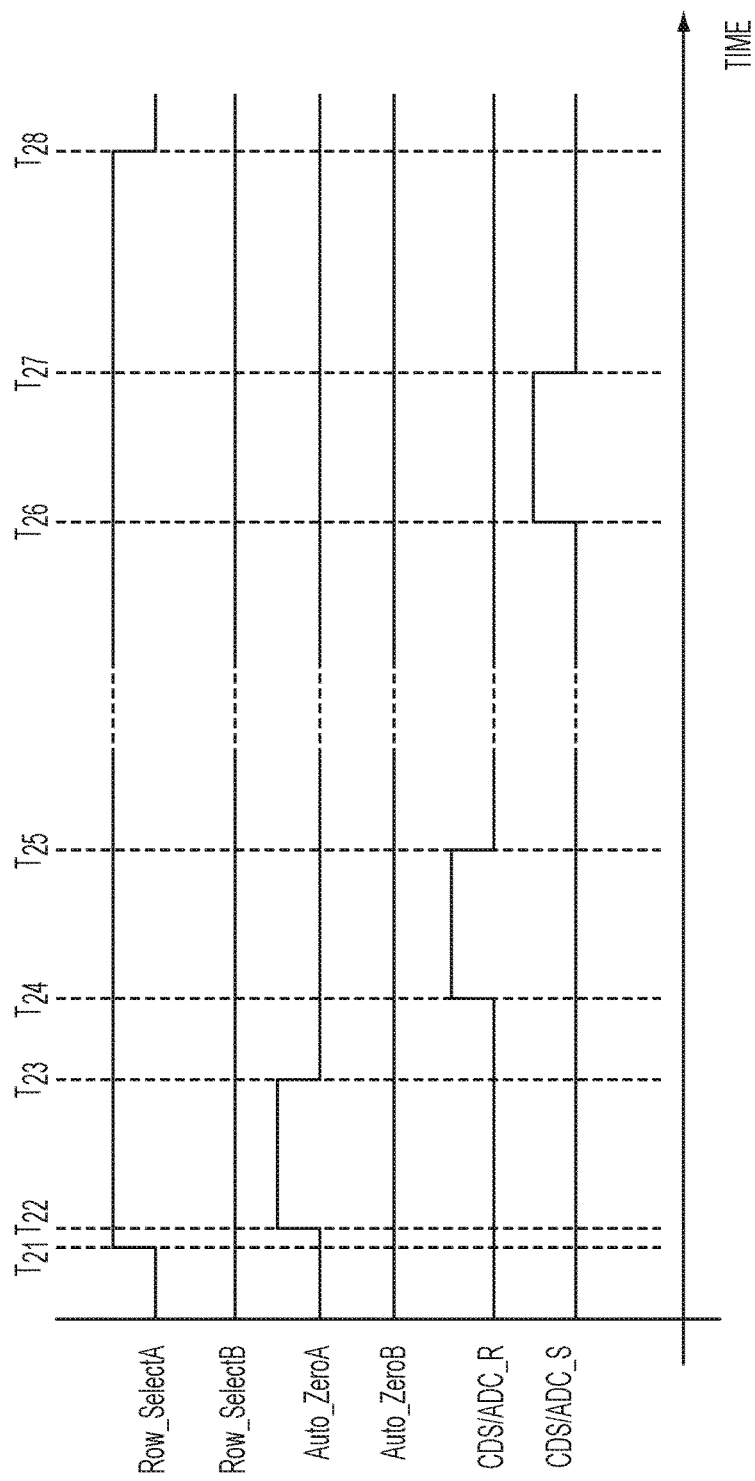
FIG. 8 is a graph of waveforms of various signals of the image sensor in FIG. 7 in accordance with some embodiments.

FIG. 8 is a graph of waveforms of various signals of the image sensor in FIG. 7 in accordance with some embodiments.

At time $T_{21}$, signal Row_SelectA transitions from the logical low level to the logical high level indicating that pixel unit cell 702 is selected to be coupled to signal ling COL. As a result, switch 240A is turned on. In some embodiments, only one pixel unit cell in the column of pixel unit cells associated with signal COL is electrically coupled to signal line COL. For example, signal Row_SelectB remains at the logical low level to turn off switch 240B. After switch 240A is turned on, current source 412 is electrically coupled with transistor 312A.

At time $T_{22}$, signal Auto_ZeroA transitions from the logical low level to the logical high level to turn on switch 228A. Thus, node 232A and node 234A are coupled together, and a voltage difference between node 232A and node 234A is substantially zero. As a result, the capacitive device 226A is discharged, and a DC operation condition for transistor 312A is established. Meanwhile, signal Auto_ZeroB remains at the logical low level to turn off switch 228B.

At time $T_{23}$, signal Auto_ZeroA transitions from the logical high level to the logical low level to turn off switch 228A. A charge integration circuit including current source 412, transistor 312A, and capacitive device 226A starts to convert charge carriers from light sensing element 212A to a voltage signal at node 234A.

At time $T_{24}$, signal CDS/ADC_R transitions from the logical low level to the logical high level. At time $T_{25}$, signal CDS/ADC_R transitions from the logical high level to the logical low level. During the period signal CDS/ADC_R is at the logical high level, the corresponding sampling circuit 120[1], 120[2], or 120[X] is controlled to sense a first voltage level of signal line COL. The first voltage level represents a reference voltage level.

At time $T_{26}$, signal CDS/ADC_S transitions from the logical low level to the logical high level. At time $T_{27}$, signal CDS/ADC_S transitions from the logical high level to the logical low level. During the period signal CDS/ADC_S is at the logical high level, the corresponding sampling circuit 120[1], 120[2], or 120[X] is controlled to sense a second voltage level of signal line COL. The second voltage level represents a voltage level corresponding to the total charge carriers transferred from light sensing element 212A to capacitive device 226A during a predetermined time period defined from time $T_{25}$ to time $T_{27}$.

At time $T_{28}$, signal Row_SelectA transitions from the logical high level to the logical low level indicating that pixel unit cell 702 is no longer selected to be coupled to signal ling COL.

Figure 9:
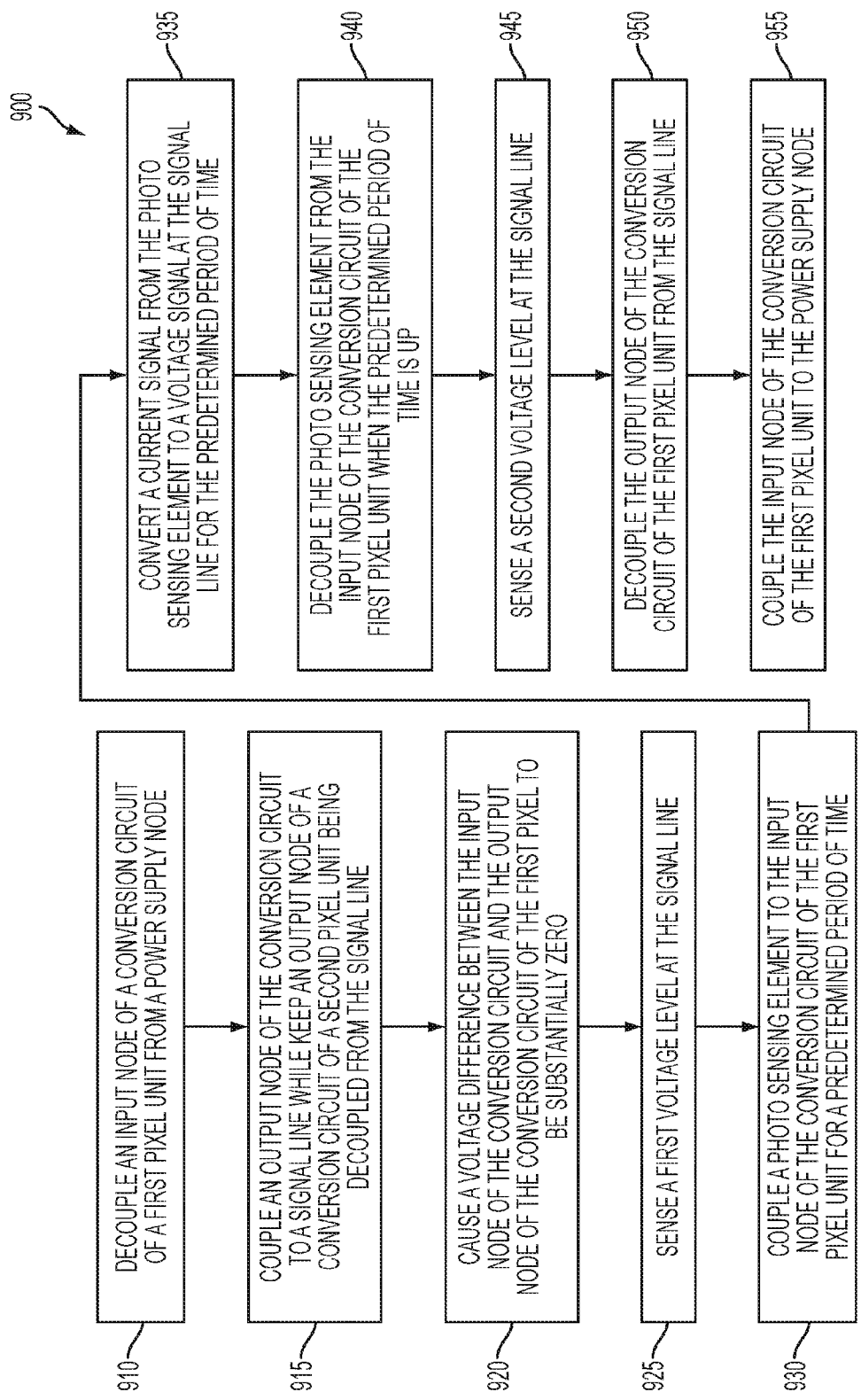
FIG. 9 is a flow chart of a method of operating an image sensor in accordance with some embodiments.

FIG. 9 is a flow chart of a method 900 of operating an image sensor, such as image sensors in FIG. 3, 4, or 6, in accordance with some embodiments. Method 900 is also applicable to operating image sensor 700, with some illustrated operations omitted as illustrated below. In the present disclosure, image sensor 400 in FIG. 4 is used as an example for facilitating the illustration of method 900. It is understood that additional operations may be performed before, during, and/or after the method 900 depicted in FIG. 9, and that some other processes may only be briefly described herein.

The process begins with operation 910, where switch 422A is turned off to decouple input node 222A of conversion circuit 220A of pixel unit cell 402 from power supply node 322. Switch 422B remains turned on to couple input node 222B of conversion circuit 220B of pixel unit cell 404 to power supply node 322. In some embodiments, if an image sensor does not have the switches corresponding to switch 422A or 422B, or switches 612A or 612B in FIG. 6, operation 910 is omitted.

The process proceeds to operation 915, where switch 240A is turned on to couple output node 224A of the conversion circuit 220A to signal line COL while keep output node 224B of conversion circuit 220B of pixel unit cell 704 being decoupled from signal line COL. In some embodiments, current source 412 is coupled to conversion circuit 220A to cause transistor 312A to function as an amplifier having a common-source configuration.

The process proceeds to operation 920, where switch 228A is turned on to cause a voltage difference between input node 222A of conversion circuit 220A and output node 224A to be substantially zero.

The process proceeds to operation 925, where a corresponding sampling circuit 120[1], 120[2], or 120[X] and/or read-out circuit 130 (FIG. 1) are operated to sense a first voltage level of signal line COL. The first voltage level is usable as a reference voltage level representing the collective effect of process variations, parasitic resistance, parasitic capacitance, and leakage currents observable at signal line COL.

The process proceeds to operation 930, where switch 216A is turned on to couple a light sensing element 212A to input node 222A for a predetermined period of time. In some embodiments, switches 218A, 216B, and 218B are turned off. In operation 935, conversion circuit 220A converts charge carriers from the light sensing element 212A to a voltage signal at the signal line COL for the predetermined period of time. Then, in operation 940, switch 216A is turned off to decouple light sensing element 212A from input node 222A when the predetermined period of time is up. In some embodiments when an image sensor does not have switches corresponding to switch 216A, 218A, 216B, and/or 218B, operations 930 and 940 are omitted.

The process proceeds to operation 945, where a corresponding sampling circuit 120[1], 120[2], or 120[X] and/or read-out circuit 130 (FIG. 1) are operated to sense a second voltage level of signal line COL. The second voltage level represents a sensed brightness or intensity of incident light received by the light sensing element during the predetermined time period.

The process proceeds to operation 950, where switch 240A is turned off to decouple output node 224A from signal line COL. In operation 955, switch 422A is turned on to couple input node 222A to power supply node 322. In some embodiments when an image sensor does not have the switches corresponding to switch 422A or 422B, or switches 612A or 612B in FIG. 6, operation 955 is omitted.

Figure 10:
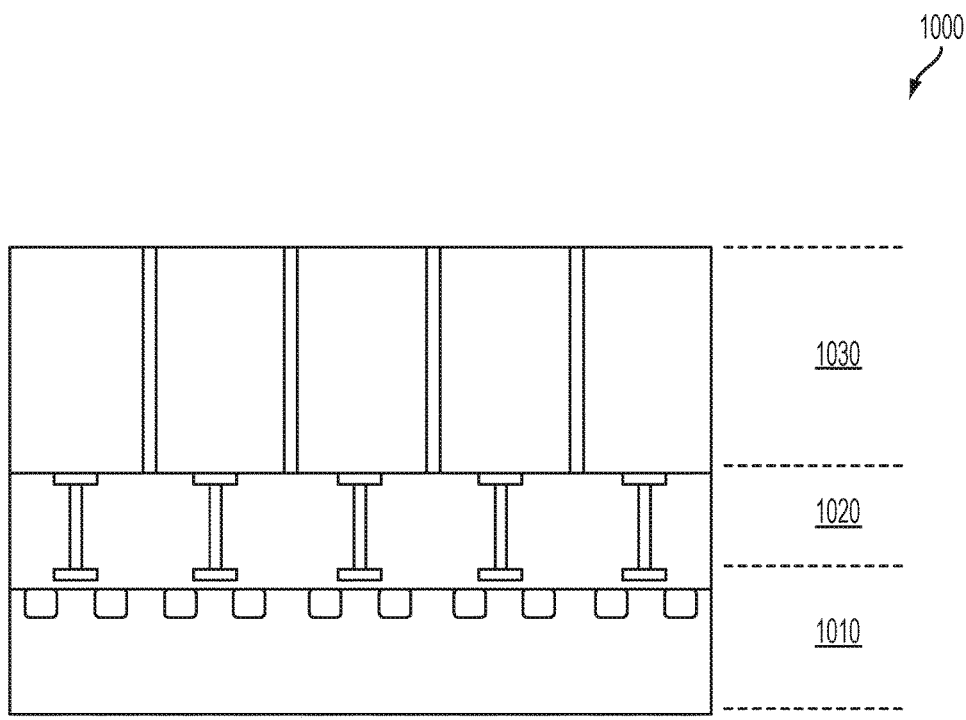
FIG. 10 is a cross-sectional view of a portion of an image sensor in accordance with some embodiments.

Image sensors illustrated in conjunction with FIGS. 1 to 9 are suitable to be implemented by elevated photodiode pixel technology. FIG. 10 is a cross-sectional view of a portion of an image sensor 1000 in accordance with some embodiments. Image sensor 1000 is usable to show the implementation of image sensor 300, 400, 600, or 700 by elevated photodiode pixel technology.

Image sensor 1000 includes an electrical component portion 1010, an interconnection portion 1020, and an elevated photodiode portion 1030. Electrical component portion 1010 includes transistors formed on a substrate. In some embodiments, the transistors in electrical component portion 1010 include transistors usable to form the conversion circuit 220A and 220B, the switching devices 240A and 240B, and/or current sources 314A, 314B, or 412. Elevated photodiode portion 1030 includes a plurality of photodiodes, such as photodiodes usable as light sensing elements 212A, 214A, 212B, and 214B. Interconnection portion 1020 is usable to configure the transistors in electrical component portion 1010 into functional circuits and to electrically connect photodiodes in elevated photodiode portion 1030 with transistors in electrical component portion 1010.

Compared with an image sensor implemented without using elevated photodiode pixel technology, image sensor 1000 has reduced pixel pitch and improved packing density of photodiodes. Although elevated photodiodes of image sensor 1000 also tends to have greater parasitic capacitance observable at an input node (e.g., node 222A or 222B) of a corresponding conversion circuit (e.g., conversion circuit 220A or 220B) in a pixel unit cell, the effect of the parasitic capacitance would be significantly reduced or eliminated by the charge integration circuit (e.g., circuit 220A and/or 220B).

Image sensors illustrated in conjunction with FIGS. 1 to 9 are also suitable to be implemented by stacked image sensor technology. FIG. 11 is a cross-sectional view of a portion of an image sensor 1100 in accordance with some embodiments. Image sensor 1100 is usable to show the implementation of image sensor 300, 400, 600, or 700 by stacked image sensor technology.

Image sensor 1100 includes an application-specific integrated circuit (ASIC) chip 1110 and an image sensor chip 1120. The ASIC chip 1110 and the image sensor chip 1120 are stacked one over the other. ASIC chip 1110 includes an electrical component portion 1112 and an interconnection portion 1114. Image sensor chip 1120 includes a photodiode portion 1122 and an interconnection portion 1124. Electrical component portion 1112 corresponds to electrical component portion 1010, and interconnection portions 1114 and 1124 correspond to interconnection portion 1020. Thus, detailed description thereof is omitted. Photodiode portion 1122 includes a plurality of photodiodes, such as photodiodes usable as light sensing elements 212A, 214A, 212B, and 214B. In some embodiments, photodiode portion 1122 is implemented using elevated photodiode pixel technology.

Compared with an image sensor implemented without using stacked image sensor technology, image sensor 1100 has reduced pixel pitch and improved packing density of photodiodes. Also, ASIC chip 1110 and image sensor chip 1120 are capable of each manufactured by different process having different electrical and physical characteristics in order to each have optimized cost, performance, and/or reliability. Although interconnection portions within and between ASIC chip 1110 and image sensor chip 1120 of image sensor 1100 would also cause greater parasitic capacitance observable at an input node (e.g., node 222A or 222B) of a corresponding conversion circuit (e.g., conversion circuit 220A or 220B) in a pixel unit cell, the effect of the parasitic capacitance would be significantly reduced or eliminated by the charge integration circuit (e.g., circuit 220A and/or 220B).

In accordance with one embodiment, a circuit includes a signal line and a pixel unit cell. The pixel unit cell includes one or more light sensing elements, a conversion circuit, and a selection switch between an output node of the conversion circuit and the signal line. In the pixel unit cell, the conversion circuit is configured to convert charge carriers from the one or more light sensing elements to a voltage signal at the output node of the conversion circuit.

In accordance with another embodiment, a circuit includes a plurality of pixel unit cells arranged as rows of pixel unit cells and columns of pixel unit cells and a plurality of signal lines. Each pixel unit cell of the plurality of pixel unit cells includes an output node, a charge integration circuit, and a selection switch between the charge integration circuit and the output nod. Each signal line of the plurality of signal lines is electrically coupled to the output nodes of the pixel unit cells in a corresponding column of the columns of pixel unit cells.

In accordance with another embodiment, a method includes coupling, by a first switch, an output node of a charge integration circuit of a first pixel unit cell to a signal line. An output node of a charge integration circuit of a second pixel unit cell is decoupled by a second switch from the signal line. Charge carriers from a light sensing element of the first pixel unit cell are converted by the charge integration circuit of the first pixel unit cell to a voltage signal at the signal line during a predetermined period of time. Moreover, a voltage level of the voltage signal at the signal line is sensed.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit, comprising:
  a light sensing element;
  a conversion circuit that includes a first switch, a transistor, and a current source, wherein the conversion circuit is configured to:
    convert charge carriers from the light sensing element to an output voltage; and
    cause a voltage difference between an input node and an output node of the conversion circuit to be substantially zero;
  a second switch coupled between the conversion circuit and the light sensing element; and
  a third switch coupled between the conversion circuit and a signal line;
  wherein:
  the first switch is coupled between the input node of the conversion circuit and the output node of the conversion circuit; and
  the current source is coupled between a power supply node and the output node of the conversion circuit.

2. The circuit of claim 1, further comprising a plurality of the light sensing elements and a plurality of the second switches, wherein the plurality of the light sensing elements are electrically coupled in parallel and are each coupled to the conversion circuit via respective second switches.

3. The circuit of claim 1, wherein the light sensing element, the conversion circuit, the second switch, and the third switch are parts of a pixel unit cell, and wherein the circuit comprises a plurality of the pixel unit cells.

4. The circuit of claim 3, wherein the third switch of each of the pixel unit cells is coupled to a same signal line, and wherein the signal line is coupled to a read-out circuit via a sampling circuit.

5. The circuit of claim 1, wherein:
  a gate of the transistor is coupled to the input node of the conversion circuit;
  a drain of the transistor is coupled to the output node of the conversion circuit; and
  a source of the transistor is coupled to ground.

6. The circuit of claim 1, wherein the conversion circuit further includes a capacitor that is electrically coupled in parallel with the first switch, and wherein the capacitor discharges in response to the first switch being turned on.

7. The circuit of claim 6, wherein a capacitance value of the capacitor is programmable.

8. The circuit of claim 1, further comprising a reset switch configured to electrically couple or decouple the input node of the conversion circuit to or from a power supply in response to a reset signal.

9. An image sensor, comprising:
  a read-out circuit;
  a plurality of sampling circuits coupled to the read-out circuit; and
  a plurality of pixel unit cells arranged into a plurality of rows and a plurality of columns, wherein an output node of the pixel unit cells in each column is coupled to a respective one of the sampling circuits via a signal line, and wherein each of the pixel unit cells includes:
  a plurality of light sensing elements;
  a conversion circuit that includes, a capacitor, a transistor, a current source, and a first switch, wherein the conversion circuit is configured to:
    convert charge carriers from the light sensing elements to an output voltage; and
    cause a voltage difference between an input node and an output node of the conversion circuit to be substantially zero;
  a plurality of second switches each coupled between the conversion circuit and a respective one of the light sensing elements; and
  a third switch coupled between the conversion circuit and the output node of the pixel unit cell;
  wherein:
  the first switch is coupled between the input node of the conversion circuit and the output node of the conversion circuit; and the current source is coupled between a power supply node and the output node of the conversion circuit.

10. The image sensor of claim 9, wherein
a gate of the transistor is coupled to the input node of the conversion circuit;
a drain of the transistor is coupled to the output node of the conversion circuit; and
a source of the transistor is coupled to ground.

11. The image sensor of claim 9, wherein the capacitor discharges in response to the first switch being turned on.

12. The image sensor of claim 9, wherein the capacitor is coupled between the input node of the conversion circuit and the output node of the conversion circuit.

13. The image sensor of claim 9, wherein the capacitor has a programmable capacitance.

14. A method, comprising:
configuring a conversion circuit at least in part by:
coupling an input node of the conversion circuit to: a gate of a transistor and a first terminal of a first switch; and
coupling an output node of the conversion circuit to a drain of the transistor, a second terminal of the first switch, and a current source;
converting, via a light-sensing element, an intensity of an incident light into charge carriers;
converting, via the conversion circuit, the charge carriers to an output voltage; and
causing a voltage difference between the input node and the output node of the conversion circuit to be substantially zero.

15. The method of claim 14, wherein the configuring the conversion circuit further comprises: electrically coupling a capacitor in parallel with the first switch.

16. The method of claim 15, further comprising: causing the capacitor to discharge at least in part by turning on the first switch.

17. The method of claim 15, further comprising: programming a capacitance value of the capacitor.

18. The method of claim 15, further comprising: selectively coupling the light-sensing element to the input node of the conversion via a second switch.

19. The method of claim 18, further comprising: selectively coupling the output node of the conversion circuit to a signal line via a third switch.

20. The method of claim 14, further comprising: selectively coupling the input node of the conversion circuit to a power supply via a reset switch.

* * * * *